US012587694B2

(12) United States Patent
    Li

(10) Patent No.: US 12,587,694 B2
(45) Date of Patent: Mar. 24, 2026

(54) METHOD, APPARATUS, DEVICE AND STORAGE MEDIUM FOR VIDEO GENERATION

(71) Applicant: Beijing Zitiao Network Technology Co., Ltd., Beijing (CN)

(72) Inventor: Yansong Li, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/926,073

(22) Filed: Oct. 24, 2024

(65) Prior Publication Data

US 2025/0168421 A1     May 22, 2025

(30) Foreign Application Priority Data

Nov. 20, 2023    (CN) .......................... 202311548953.7

(51) Int. Cl.
    *H04N 21/234*     (2011.01)
    *G06V 10/74*      (2022.01)
    *H04N 21/845*     (2011.01)

(52) U.S. Cl.
    CPC ..... *H04N 21/23424* (2013.01); *G06V 10/761* (2022.01); *H04N 21/8456* (2013.01)

(58) Field of Classification Search
    None
    See application file for complete search history.

(56) References Cited

U.S. PATENT DOCUMENTS

| | | | | |
|---|---|---|---|---|
| 2016/0029105 A1* | 1/2016 | Newman | ................ | G11B 27/22 |
| | | | | 386/281 |
| 2021/0224550 A1* | 7/2021 | Zeng | ...................... | G11B 27/28 |
| 2021/0390317 A1* | 12/2021 | Kim | .................... | H04N 21/4662 |
| 2022/0021915 A1* | 1/2022 | Shanson | .............. | H04N 21/812 |
| 2022/0108726 A1* | 4/2022 | Li | ........................ | G11B 27/031 |
| 2023/0036690 A1* | 2/2023 | Li | ........................ | G11B 27/031 |
| 2023/0092847 A1* | 3/2023 | Narayan | ............ | H04N 21/8456 |
| | | | | 386/241 |

(Continued)

FOREIGN PATENT DOCUMENTS

| | | |
|---|---|---|
| CN | 107770626 A | 3/2018 |
| CN | 110602552 A | 12/2019 |

(Continued)

OTHER PUBLICATIONS

International Search Report and Written Opinion for International Application No. PCT/CN2024/125386 , mailed 23 Dec. 23, 2024, 14 pages.

*Primary Examiner* — Alexander Q Huerta
(74) *Attorney, Agent, or Firm* — Astute IP Law Group

(57)     ABSTRACT

The present disclosure provides a method, apparatus, device for and storage medium for video generation, and the method comprises: obtaining a plurality of media materials with a sequential relationship, the plurality of media materials comprising a first media material and a second media material with an adjacent sequential relationship, generating a first video clip based on the first media material, and generating a second video clip based on the second media material, generating a merged video clip based on the first and the second video clips, and finally generating a target video based on the merged video clip.

20 Claims, 4 Drawing Sheets

OBTAIN A PLURALITY OF MEDIA MATERIALS WITH A SEQUENTIAL RELATIONSHIP, WHEREIN THE MEDIA MATERIAL IS A PICTURE OR A VIDEO CLIP, AND THE PLURALITY OF MEDIA MATERIALS COMPRISE A FIRST MEDIA MATERIAL AND A SECOND MEDIA MATERIAL WITH AN ADJACENT SEQUENTIAL RELATIONSHIP — S101

GENERATE A FIRST VIDEO CLIP BASED ON THE FIRST MEDIA MATERIAL AND GENERATE A SECOND VIDEO CLIP BASED ON THE SECOND MEDIA MATERIAL — S102

GENERATE, BASED ON THE FIRST AND SECOND VIDEO CLIPS, A MERGED VIDEO CLIP, WHEREIN THE MERGED VIDEO CLIP COMPRISES A FIRST VIDEO SUB-CLIP FROM THE FIRST VIDEO CLIP AND A SECOND VIDEO SUB-CLIP FROM THE SECOND VIDEO CLIP, AND AN IMAGE SIMILARITY OF ADJACENT IMAGE FRAMES BETWEEN THE FIRST AND SECOND VIDEO SUB-CLIPS MEETS A PREDETERMINED SIMILARITY CONDITION — S103

GENERATE A TARGET VIDEO BASED ON THE MERGED VIDEO CLIP — S104

(56)        References Cited

U.S. PATENT DOCUMENTS

| 2023/0300428 | A1 * | 9/2023 | Guo | G06V 20/48 |
| | | | | 725/116 |
| 2024/0314406 | A1 * | 9/2024 | Meier | G06N 20/00 |
| 2024/0348846 | A1 * | 10/2024 | Xue | H04N 21/44008 |
| 2024/0363145 | A1 * | 10/2024 | Zhou | G06V 20/49 |

FOREIGN PATENT DOCUMENTS

| CN | 113301409 | A | 8/2021 |
| CN | 113852840 | A | 12/2021 |
| CN | 116055798 | A | 5/2023 |
| JP | 2022094684 | A | 6/2022 |

* cited by examiner

METHOD, APPARATUS, DEVICE AND STORAGE MEDIUM FOR VIDEO GENERATION

CROSS-REFERENCE

The present application claims priority to Chinese Patent Application No. 202311548953.7, filed on Nov. 20, 2023, and entitled "METHOD, APPARATUS, DEVICE AND STORAGE MEDIUM FOR VIDEO GENERATION", the entirety of which is incorporated herein by reference.

FIELD

The present disclosure relates to the field of data processing, and in particular to a method, apparatus, device, and storage medium for video generation.

BACKGROUND

With the continuous development of computer technologies, methods of creating videos by uploading media materials in an application are becoming more and more popular.

However, the current video creation methods are monotonous, and how to diversify the video creation methods has become an urgent technical problem that needs to be solved.

SUMMARY

To resolve the foregoing technical problem, embodiments of the present disclosure provide a video generation method.

According to a first aspect, the present disclosure provides a method for video generation, comprising: obtaining a plurality of media materials with a sequential relationship, wherein the media material is a picture or a video clip, and the plurality of media materials comprise a first media material and a second media material with an adjacent sequential relationship; generating a first video clip based on the first media material and generating a second video clip based on the second media material; generating, based on the first video clip and second video clip, a merged video clip, wherein the merged video clip comprises a first video sub-clip from the first video clip and a second video sub-clip from the second video clip, and an image similarity of adjacent image frames between the first and second video sub-clips meets a predetermined similarity condition; and generating a target video based on the merged video clip.

In an optional implementation, generating, based on the first and second video clips, the merged video clip comprises: determining, based on the image similarity, a first image frame and a second image frame from the first and second video clips, respectively, wherein the first image frame is from the first video clip, and the second image frame is from the second video clip; clipping, based on the first image frame, the first video sub-clip from the first video clip, and clipping, based on the second image frame, the second video sub-clip from the second video clip; and generating, based on the adjacent sequential relationship and the first sub-clip and second video sub-clip, the merged video clip.

In an optional implementation, the first media material among the first and second media materials with the adjacent sequential relationship precedes the second media material, and before generating, based on the adjacent sequential relationship and the first and second video sub-clips, the merged video clip, the method further comprises: obtaining a second reversed video sub-clip by performing a reverse playback processing on the second video sub-clip; and correspondingly, generating, based on the adjacent sequential relationship and the first and second video sub-clips, the merged video clip comprises: generating the merged video clip based on the adjacent sequential relationship, the first and the second reversed video sub-clips.

In an optional implementation, after generating the merged video clip based on the adjacent sequential relationship and the first and second video sub-clips, the method further comprises: determining whether a total number of image frames of the merged video clip is less than a predetermined number threshold; and in accordance with a determination that the total number of image frames is less than the predetermined number threshold, triggering to perform the determining, based on the image similarity, the first and second image frames from the first and second video clips, respectively, until a merged video clip whose total number of image frames is no less than the predetermined number threshold is obtained.

In an optional implementation, wherein the plurality of media materials further comprises a third media material that is a last media material of the plurality of media materials with the sequential relationship, and before generating the target video based on the merged video clip, the method further comprises: generating a third video clip based on the third media material, and correspondingly, generating the target video based on the merged video clip comprises: performing a merging processing based on the sequential relationship, the merged video clip and the third video clip, to obtain the target video.

In an optional implementation, the target video comprises image frames respectively corresponding to the plurality of media materials, and the image frames respectively corresponding to the plurality of media materials meet the sequential relationship.

In an optional implementation, generating the first video clip based on the first media material and generating the second video clip based on the second media material comprises: generating, based on predetermined public target content, the first video clip by using the first media material as an initial image frame, and generating the second video clip by using the second media material as an initial image frame.

According to a second aspect, the present disclosure provides an apparatus for video generation, comprising: an obtaining module configured for obtaining a plurality of media materials with a sequential relationship, wherein the media material is a picture or a video clip, and the plurality of media materials comprise a first media material and a second media material with an adjacent sequential relationship; a first generation module configured for generating a first video clip based on the first media material and generating a second video clip based on the second media material; a second generation module configured for generating, based on the first and second video clips, a merged video clip, wherein the merged video clip comprises a first video sub-clip from the first video clip and a second video sub-clip from the second video clip, and an image similarity of adjacent image frames between the first and second video sub-clips meets a predetermined similarity condition; and a third generation module configured for generating a target video based on the merged video clip.

According to a third aspect, the present disclosure provides a computer readable storage medium, where the computer readable storage medium stores instructions, the instructions when performed by a terminal device, causing the terminal device to the foregoing method.

According to a fourth aspect, the present disclosure provides a device for video generation, comprising a memory, a processor, and a computer program that is stored in the memory and executable on the processor, where the processor, when performing the computer program, implements the foregoing method.

According to a fifth aspect, the present disclosure provides a computer program product, where the computer program product includes a computer program/instruction, and when the computer program/instruction is performed by a processor, the foregoing method is implemented.

BRIEF DESCRIPTION OF DRAWINGS

The drawings herein are incorporated in and constitute a part of this specification, the drawings illustrate embodiments in accordance with the present disclosure, and are used in conjunction with the description to explain the principles of the present disclosure.

In order to more clearly illustrate the technical solutions in the embodiments of the present disclosure or in the prior art, the accompanying drawings used in a description of the embodiments or the prior art will be briefly introduced below, and it is obvious to those skilled in the art that other drawings may be obtained according to these drawings without creative labor.

DETAILED DESCRIPTION

In order to be able to more clearly understand the above purposes, features and advantages of the present disclosure, the solutions of the present disclosure will be further described below. It should be noted that, the embodiments and the features in embodiments of the present disclosure may be combined with each other without conflict.

Many specific details are set forth in the following description to facilitate a thorough understanding of the present disclosure, but the present disclosure may also be implemented in other ways other than those described herein. Obviously, the embodiments in the specification are only part of the embodiments of the present disclosure, not all embodiments.

With the continuous development of computer technologies, methods of creating videos by uploading media materials in an application are becoming more and more popular.

However, the current video creation methods are monotonous, and how to enrich the video creation methods has become an urgent technical problem that needs to be solved.

To solve this problem, a method for video generation provided by the embodiments of the present disclosure comprises: firstly, obtaining a plurality of media materials with a sequential relationship, wherein the media material is a picture or a video clip, and the plurality of media materials comprise a first media material and a second media material with an adjacent sequential relationship; then generating a first video clip based on the first media material, and generating a second video clip based on the second media material, and generating a merged video clip based on the first and the second video clip, wherein the merged video clip comprises a first video clip from the first and second video clip from the second video clip, and an image similarity of adjacent image frames between the first and the second video clips meets a predetermined similarity condition, and finally, generating a target video based on the merged video clip.

According to embodiments of the present disclosure, a target video is generated based on a plurality of media materials with a sequential relationship, a smooth transition of image frame content in the target video is achieved through an image similarity calculation, the probability of content skipping during playing the target video is reduced, and the video creation methods are diversified.

Figure 1:
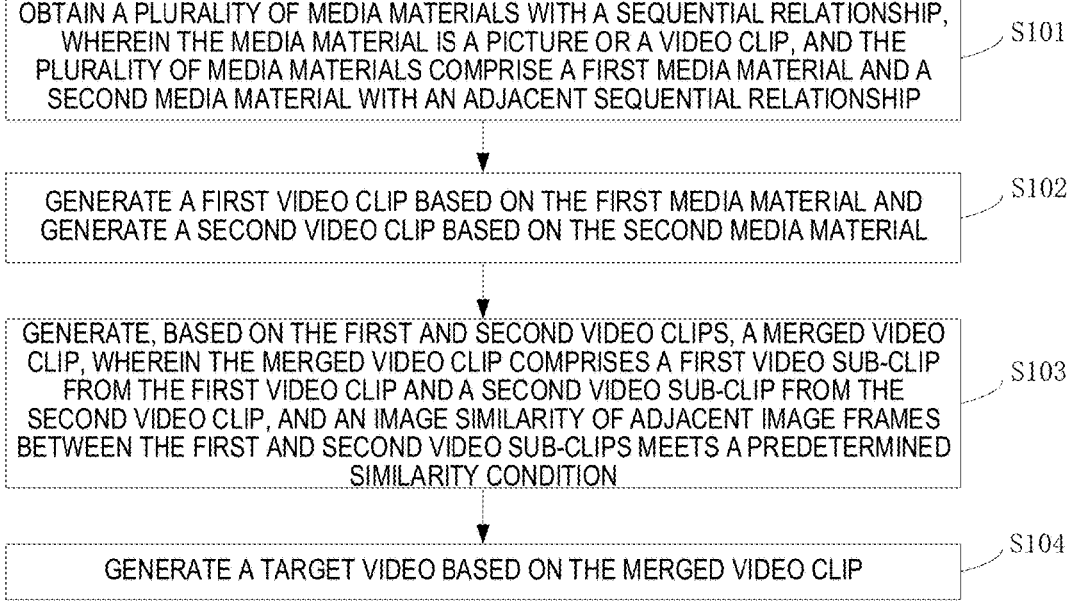
FIG. 1 is a flowchart of a method for video generation according to an embodiment of the present disclosure.

Specifically, the embodiment of the present disclosure provides a method for video generation. FIG. 1 is a flowchart of a method for video generation according to an embodiment of the present disclosure, the method comprises: S101: obtain a plurality of media materials having a sequential relationship, wherein the media material is a picture or a video clip, and the plurality of media materials comprise a first media material and a second media material with an adjacent sequential relationship.

The method for video generation provided in the embodiment of the present disclosure may be applied to a client. For example, the client may include a client deployed in a smartphone, or a client deployed in a tablet computer, and the like. The method for video generation provided in the embodiment of the present disclosure may also be applied to a server.

In this embodiment of the present disclosure, the media material may include a picture or a video clip selected from a user album page, or may include a picture or a video clip obtained by the user based on the shotting page.

The first and second media materials may be any two of the media materials having an adjacent sequential relationship. The adjacent sequential relationship between the first and second media materials may include: the first media material precedes the second media material, or the first media material follows the second media material.

S102: generate a first video clip based on the first media material and generate a second video clip based on the second media material.

Generating a first video clip based on the first media material and generate a second video clip based on the second media material may include: processing the first and the second media materials by using an associated video generation model(s) or a video generation algorithm(s) to obtain a corresponding first video clip and a corresponding second video clip.

In addition, based on the predetermined public target content, the first and second media materials may be processed to generate the first video clip corresponding to the first media material and the second video clip corresponding to the second media material.

In an optional implementation, the first video clip is generated based on the predetermined public target content by using the first media material as an initial image frame, and the second video clip is generated by using the second media material as an initial image frame. The predetermined public target content refers to predetermining a public target generation content, that is, a first video clip is generated based on the first media material in a direction of the predetermined public target content; and a second video clip is generated based on the second media material in a direction of the predetermined public target content.

Figure 2:
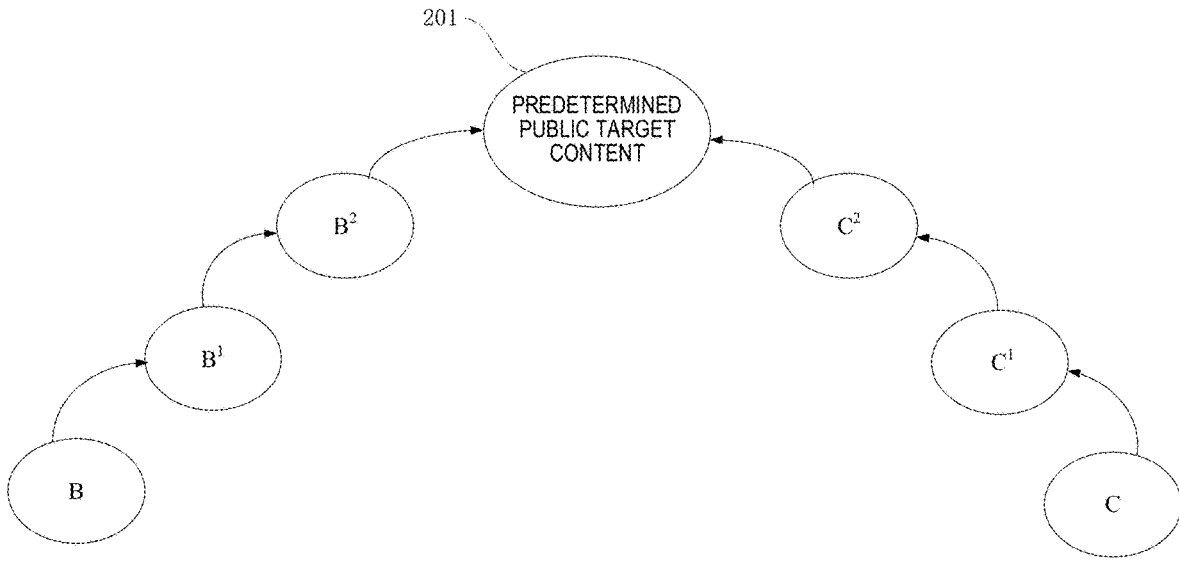
FIG. 2 is a schematic diagram of generating a video clip based on predetermined public target content according to an embodiment of the present disclosure.

FIG. 2 is a schematic diagram of generating a video clip based on predetermined public target content according to an embodiment of the present disclosure. In this schematic diagram, the predetermined public target content 201 is used as a direction for generation. By using the first media material B as an initial image frame, the first video clip is generated in the direction of the predetermined public target content 201, where $B^1$, $B^2$ respectively are the image frames generated by the first media material B in the direction of the predetermined public target content. By using the second media material C as an initial image frame, the second video clip is generated in the direction of the predetermined public target content 201, where $C^1$, $C^2$ respectively are the image frames generated by the second media material C in the predetermined public target content direction.

In another optional implementation, based on a processing method without public target content, i.e., infinitely divergent generation content, the first and the second media material may also be processed to generate the first video clip corresponding to the first media material and the second video clip corresponding to the second media material. Specifically, the first video clip is generated by processing the first media material, and the second video clip is generated by processing the second video clip. The first and the second video clips are video clips generated in a method of infinitely divergent generation content.

S103: generating, based on the first and second video clips, a merged video clip, wherein the merged video clip comprises a first video sub-clip from the first video clip and a second video sub-clip from the second video clip, and an image similarity of adjacent image frames between the first and second video sub-clips meets a predetermined similarity condition.

In the embodiment of the present disclosure, the predetermined image similarity condition(s) may include a condition with a highest image similarity, a condition that the image similarity value is not less than a predetermined similarity threshold, and/or the like.

In practice, in order to improve the smoothness of the content displayed in the target video, before generating the merged video clip based on the first and the second video clips, according to the embodiment of the present disclosure, the first and the second image frames may be determined from the first and the second video clips based on the image similarity, respectively, wherein the first image frame is from the first video clip, and the second image frame is from the second video clip. An image similarity between the first and the second image frames meets a predetermined similarity condition.

In practice, pairwise similarity calculation is performed between any image frame in the first video clip and each image frame in the second video clip, respectively, so as to determine a similarity value between the image frame and each image frame in the second video clip. Based on the foregoing manner, if the predetermined image similarity condition is a condition of having the highest image similarity, a similarity value between each image frame in the first video clip and each image frame in the second video clip is calculated, to obtain a similarity value between every two image frames in the first and the second video clips. Two image frames with the highest similarity value may be determined through comparison.

The method for calculating the image similarity may be specifically set based on requirements, which is not limited in the embodiments of the present disclosure.

As shown in FIG. 2, that is a schematic diagram of generating a video clip based on predetermined public target content, the first video clip includes an initial image frame B and image frames $B^1$ and $B^2$ generated by the initial image frame B, and the second video clip includes an initial image frame C and image frames $C^1$ and $C^2$ generated by the initial image frame C. Then the image similarity calculation is performed on every two image frames in the first and the second video clips to obtain the image similarity value of 9 groups of image frames: (B, C), (B, $C^1$), (B, $C^2$), ($B^1$, C) ($B^1$, $C^1$), ($B^1$, $C^2$), ($B^2$, C), ($B^2$, $C^1$), ($B^2$, $C^2$). If the image similarity value of ($B^2$, $C^1$) is the highest, $B^2$ may be determined as the first image frame in the first video clip, and $C^1$ may be determined as the second image frame in the second video clip.

After the first and the second image frames are determined, the first and the second video clips may be clipped for the first and the second image frame according to the embodiment of the present disclosure. Specifically, based on the first image frame, a first video sub-clip is clipped from the first video clip, and based on the second image frame, a second video sub-clip is clipped from the second video clip. The first video sub-clip is a video sub-clip obtained by clipping the first video clip from the location of the first image frame, and the second video sub-clip is a video sub-clip obtained by clipping the second video clip from the location of the second image frame.

The first video sub-clip is obtained by clipping the first video clip based on the location information of the first image frame, that is, the first video sub-clip is obtained by clipping the first video clip from the location of the first image frame. The second video sub-clip is obtained by clipping the second video clip based on the location information of the second image frame, that is, the second video sub-clip is obtained by clipping the second video clip from the location of the second image frame. The location information of the first image frame and the location information of the second image frame is location information based on the timeline.

As shown in FIG. 2, that is a schematic diagram of generating the video clip based on the predetermined public target content, assuming that the position information of the first image frame $B^2$ based on the timeline is the fifth second, then from zero second to the fifth second in the first video clip are clipped to obtain the first video sub-clip. Assuming that the position information of the second image frame $C^1$ based on the timeline is the sixth second, then from zero second to the sixth second in the second video clip are clipped to obtain the second video sub-clip.

Based on the foregoing embodiments, a merged video clip is generated based on the first and the second video sub-clips, and specifically, a merged video clip is generated based on the first and the second video sub-clips and the adjacent sequential relationship between the media materials. The merged video clip includes the first and the second image frames with the adjacent sequential relationship.

In practice, in order to implement more natural connection between the first and the second video sub-clips in the merged video clip, before generating the merged video clip, reverse processing may be performed on the second video sub-clip in the embodiment of the present disclosure. The second video sub-clip is obtained by clipping a second video clip corresponding to the second media material, and the first media material among the first and second media materials with the adjacent sequential relationship precedes the second media material.

Specifically, reverse playback processing is performed on the second video sub-clip to obtain a second reversed video sub-clip, and correspondingly, the merged video clip is generated based on the first video sub-clip and the second reversed video sub-clip and the adjacent sequential relationship of the media materials.

The reverse playback processing may be implemented based on a related module(s), which is not limited in the embodiments of the present disclosure.

As shown in FIG. 2, that is a schematic diagram of generating the video clip based on the predetermined public target content, assuming that the image frame playing sequence of the first video sub-clip is B→B¹→B², and the image frame playing sequence of the second video sub-clip is C→C¹→C². A reverse playback processing is performed on the second video sub-clip to obtain the second reversed video sub-clip, and the image frame playing sequence of the second reverse order video sub-clip is C²→C¹→C. The merged video clip is generated based on the first video sub-clip and the second reversed video sub-clip, and the image frame playing sequence of the merged video clip includes B→B¹→B²→C→C¹→C².

After generating the merged video clip based on the first and the second video sub-clips, in order to ensure the quality of playing the merged video clip, and to improve the viewing experience of users, in this embodiment of the present disclosure, it may also need to determine whether a total number of image frames of the merged video clip is less than a predetermined number threshold.

Specifically, whether the total number of image frames of the merged video clip is less than the predetermined number threshold is determined. The predetermined number threshold may include a total number of image frames of the merged video clip. That is, whether the total number of image frames of the first and the second video sub-clips is greater than or equal to a predetermined number threshold is also needed to determine.

In accordance with a determination that the total number of image frames is less than the predetermined number threshold, the step of determining the first and the second image frame from the and the second video clip based on the image similarity is triggered, until a merged video clip whose total number of image frames is not less than the predetermined number threshold is obtained.

In an optional implementation, when the total number of image frames of the first and the second video sub-clips is less than the predetermined number threshold, based on the descending sequence of the image similarity value of each image frame in the first video clip and the image similarity value of each image frame in the second video clip, two image frames with the second-ranking image similarity value are reused as the first and the second image frame. Then, based on the location information of the first and the second image frames, the first and the second video sub-clips are obtained by clipping the first and the second video clips. Continue to analyze whether the total number of image frames of the first and the second video sub-clips is greater than a predetermined number threshold, until a merged video clip is obtained whose total number of image frames meets a predetermined number threshold.

The embodiment of the present disclosure may avoid the problem that the number of the image frames of the merged video clip which is merged based on the first and the second video sub-clips is too small by setting the predetermined number threshold value, so that the viewing experience of users is ensured.

In practice, the predetermined display duration may also be set, that is, the total display duration of the first and the second video sub-clips is not less than the predetermined display duration. That is, on the basis that the predetermined similarity condition is met, based on the first and the second video clip, whether the total display duration of the first and the second video sub-clips is not less than the predetermined display duration is determined. If the total display duration of the first and the second video sub-clips is less than the predetermined display duration, the first and the second image frames which meet the predetermined image similarity condition is re-determined, and continue to find the two image frames which meet the condition.

S104: generate a target video based on the merged video clip.

The target video includes image frames respectively corresponding to a plurality of media materials, and the image frames respectively corresponding to the plurality of media materials meet a sequential relationship.

Figure 3:
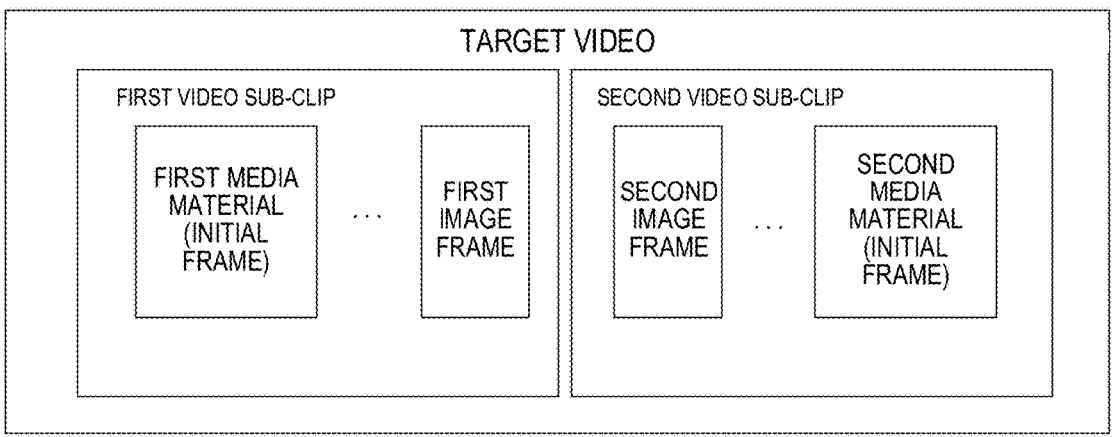
FIG. 3 is a schematic diagram of displaying a target video according to an embodiment of the present disclosure.

FIG. 3 is a schematic diagram of displaying a target video according to an embodiment of the present disclosure. In the schematic diagram, an image frame of a first media material is used as an initial frame and an image frame of a second media material is used as an end frame of a target video, and an image similarity of two adjacent image frames at a splicing location of the first and the second video sub-clips meets a predetermined similarity condition, that is, an image similarity between the first and the second image frames meets a predetermined similarity condition.

A method for video generation provided by the embodiments of the present disclosure comprises: firstly, obtaining a plurality of media materials with a sequential relationship, wherein the media material is a picture or a video clip, and the plurality of media materials comprise a first media material and a second media material with an adjacent sequential relationship; then generating a first video clip based on the first media material, and generating a second video clip based on the second media material, and generating a merged video clip based on the first and the second video clip, wherein the merged video clip comprises a first video clip from the first and second video clip from the second video clip, and an image similarity of adjacent image frames between the first and the second video clips meets a predetermined similarity condition, and finally, generating a target video based on the merged video clip.

According to embodiments of the present disclosure, a target video is generated based on a plurality of media materials with a sequential relationship, a smooth transition of image frame content in the target video is achieved through an image similarity calculation, the probability of content skipping during playing the target video is reduced, and the video creation methods are diversified.

In an optional implementation, the plurality of media materials may further include a third media material, and the third media material is a last media material of the plurality of media materials with the sequential relationship. Before generating the target video based on the merged video clip, the third media material may be further processed.

Specifically, the third video clip is generated based on the third media material. Correspondingly, based on the sequential relationship, the target video is generated based on the merged video clip and the third video clip, where the target video includes the third video clip.

In an optional implementation, the plurality of media materials includes two media materials, that is, a first media material and a second media material, in this case, the second media material is the third media material, that is, the last media material. Before generating the target video based on the merged video clip, a third video clip is generated based on the second media material. Based on the sequential relationship, the target video is generated based on the merged video clip and the third video clip, where the target video includes the third video clip. The process of generating the third video clip may refer to the process of generating the first video clip by using the first media material and generating the second video clip by using the second media material, which will not be discussed in detail herein.

Figure 4:
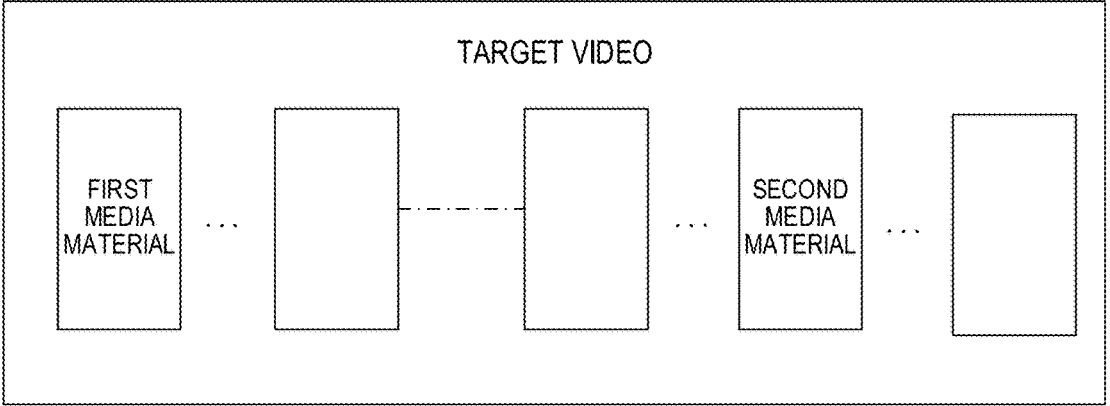
FIG. 4 is a further schematic diagram of displaying a target video according to an embodiment of the present disclosure.

FIG. 4 is a schematic diagram of displaying a target video according to an embodiment of the present disclosure. In the schematic diagram, an image frame of a first media material is used as an initial frame, and a last image frame in a third video clip generated by a second media material is used as an end frame.

In another optional implementation, the third media material may be a media material except the first and the second media material. The third media material is the last media material of the plurality of media materials with the sequential relationship. Before generating the target video based on the merged video clip, a third video clip is generated based on the third media material. Based on the sequential relationship, the target video is generated based on the merged video clip and the third video clip. The process of generating the third video clip may refer to the process of generating the first video clip by using the first media material and generating the second video clip by using the second media material, which will not be discussed in detail herein.

Figure 5:
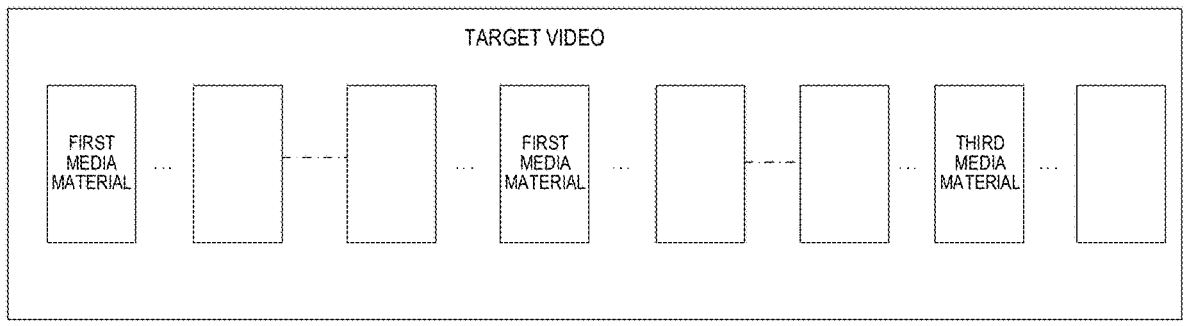
FIG. 5 is a further schematic diagram of displaying a target video according to an embodiment of the present disclosure.

FIG. 5 is a schematic diagram of displaying a target video according to an embodiment of the present disclosure. In the schematic diagram, an image frame of a first media material is used as an initial frame, and a last image frame in a third video clip generated by a third media material is used as an end frame.

Figure 6:
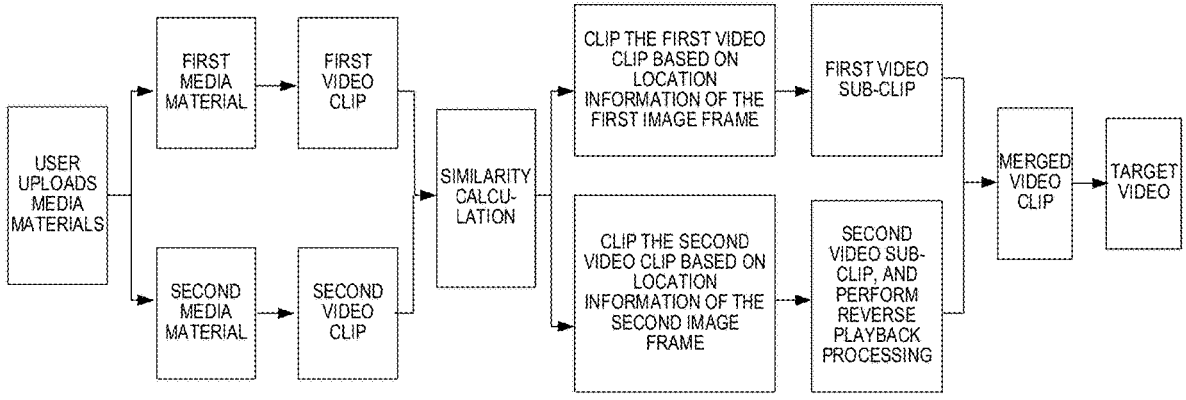
FIG. 6 is a flowchart of generating a target video according to an embodiment of the present disclosure.

To understand the foregoing embodiments, an embodiment of the present disclosure provides a schematic diagram of generating a target video, as shown in FIG. 6. For example, the user selects two media materials to generate the target video, assuming that the media material selected by the user is a first and a second media material with sequential relationship, where the first media material precedes the second media material.

First, based on a predetermined public target content, the first media material is processed to obtain a first video clip, and the second media material is processed to obtain a second video clip, and then similarity calculation is performed on the image frames in the first and the second video clips, to determine a first and a second image frame that meets a predetermined similarity condition.

Then, based on the location information of the timeline of the first and the second image frames, the first and the second video clips are clipped to obtain the first and the second video sub-clip, and a reverse playback processing is performed on the second video sub-clip to obtain the second reversed video sub-clip.

Finally, based on the first video clip and the second reversed video sub-clip and the adjacent sequential relationship, a merged video clip whose total number of image frames meets a predetermined number threshold is obtained by merging, and finally the target video is generated.

Compared with the prior art, the technical solution provided by the embodiments of the present disclosure at least has the following advantages: a method for video generation provided by the embodiments of the present disclosure comprises: firstly, obtaining a plurality of media materials with a sequential relationship, wherein the media material is a picture or a video clip, and the plurality of media materials comprise a first media material and a second media material with an adjacent sequential relationship; then generating a first video clip based on the first media material, and generating a second video clip based on the second media material, and generating a merged video clip based on the first and the second video clip, wherein the merged video clip comprises a first video clip from the first and second video clip from the second video clip, and an image similarity of adjacent image frames between the first and the second video clips meets a predetermined similarity condition, and finally, generating a target video based on the merged video clip.

According to embodiments of the present disclosure, a target video is generated based on a plurality of media materials with a sequential relationship, a smooth transition of image frame content in the target video is achieved through an image similarity calculation, the probability of content skipping during playing the target video is reduced, and the video creation methods are diversified.

Figure 7:
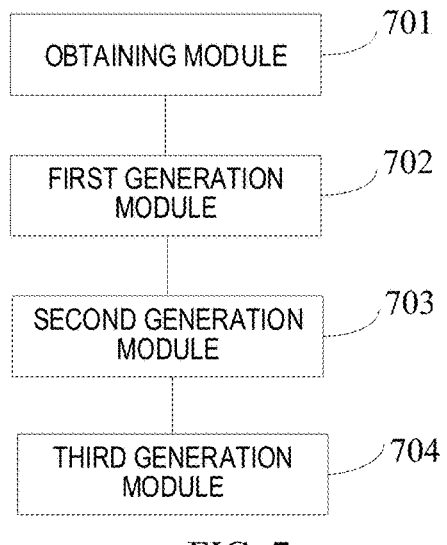
FIG. 7 is a schematic structural diagram of an apparatus for video generation according to an embodiment of the present disclosure.

Based on the foregoing embodiments, the present disclosure further provides an apparatus for video generation, referring to FIG. 7, that is a schematic structural diagram of an apparatus for video generation according to an embodiment of the present disclosure. The apparatus comprises: an obtaining module 701 configured for obtaining a plurality of media materials with a sequential relationship, wherein the media material is a picture or a video clip, and the plurality of media materials comprise a first media material and a second media material with an adjacent sequential relationship; a first generation module 702 configured for generating a first video clip based on the first media material and generating a second video clip based on the second media material; a second generation module 703 configured for generating, based on the first and second video clips, a merged video clip, wherein the merged video clip comprises a first video sub-clip from the first video clip and a second video sub-clip from the second video clip, and an image similarity of adjacent image frames between the first and second video sub-clips meets a predetermined similarity condition; and a third generation module 704 configured for generating a target video based on the merged video clip.

In an optional implementation, the second generation module includes: a first determining sub-module, configured for determining, based on the image similarity, a first image frame and a second image frame from the first and second video clips, respectively, wherein the first image frame is from the first video clip, and the second image frame is from the second video clip; a first clipping sub-module, configured for clipping, based on the first image frame, the first video sub-clip from the first video clip, and clipping, based on the second image frame, the second video sub-clip from the second video clip; and a first generating sub-module, configured for generating, based on the adjacent sequential relationship and the first and second video sub-clips, the merged video clip.

In an optional implementation, the first media material among the first and second media materials with the adjacent sequential relationship precedes the second media material, the apparatus further includes: a first processing module, configured for obtaining a second reversed video sub-clip by performing a reverse playback processing on the second video sub-clip; and correspondingly, the first generating sub-module is specifically configured for: generating the merged video clip based on the adjacent sequential relationship, the first video sub-clip and the second reversed video sub-clip.

In an optional implementation, the apparatus further includes: a first determining module, configured for determining whether a total number of image frames of the merged video clip is less than a predetermined number threshold; and a second determining module, configured for, in accordance with a determination that the total number of image frames is less than the predetermined number threshold, triggering to perform the determining, based on the image similarity, the first and second image frames from the first and second video clips, respectively, until a merged video clip whose total number of image frames is no less than the predetermined number threshold is obtained.

In an optional implementation, the plurality of media materials further comprises a third media material that is a last media material of the plurality of media materials with the sequential relationship; and the apparatus further includes: a fourth generation module, configured for generating a third video clip based on the third media material; and correspondingly, the third generation module is specifically configured for: performing a merging processing based on the sequential relationship, the merged video clip and the third video clip, to obtain the target video.

In an optional implementation, the target video comprises image frames respectively corresponding to the plurality of media materials, and the image frames respectively corresponding to the plurality of media materials meet the sequential relationship.

In an optional implementation, the first generating module is specifically configured for: generating, based on predetermined public target content, the first video clip by using the first media material as an initial image frame, and generating the second video clip by using the second media material as an initial image frame.

The apparatus for video generation provided by the embodiments of the present disclosure comprises: firstly, obtaining a plurality of media materials with a sequential relationship, wherein the media material is a picture or a video clip, and the plurality of media materials comprise a first media material and a second media material with an adjacent sequential relationship; then generating a first video clip based on the first media material, and generating a second video clip based on the second media material, and generating a merged video clip based on the first and the second video clip, wherein the merged video clip comprises a first video clip from the first and second video clip from the second video clip, and an image similarity of adjacent image frames between the first and the second video clips meets a predetermined similarity condition, and finally, generating a target video based on the merged video clip.

According to embodiments of the present disclosure, a target video is generated based on a plurality of media materials with a sequential relationship, a smooth transition of image frame content in the target video is achieved through an image similarity calculation, the probability of content skipping during playing the target video is reduced, and the video creation methods are diversified.

In addition to the foregoing method and apparatus, a computer readable storage medium is further provided in an embodiment of the present disclosure, where the computer readable storage medium stores instructions, the instructions when performed by a terminal device, causing the terminal device to implement the method for video generation according to the embodiments of the present disclosure.

A computer program product is further provided in an embodiment of the present disclosure, where the computer program product includes computer programs/instructions, and when the computer programs/instructions are performed by a processor, causing the processor to implement the method for video generation according to the embodiments of the present disclosure.

Figure 8:
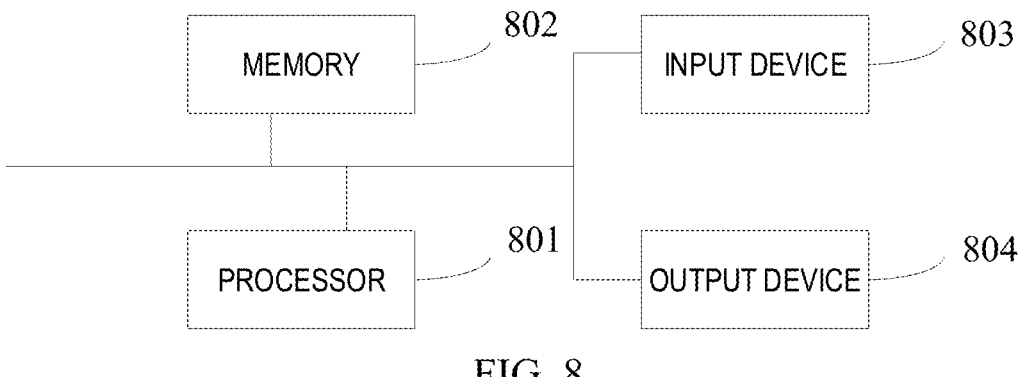
FIG. 8 is a schematic structural diagram of a device for video generation according to an embodiment of the present disclosure.

In addition, a device for video generation is further provided in an embodiment of the present disclosure, as shown in FIG. 8, which may include: the processor 801, the memory 802, the input device 803, and the output device 804. There may be one or more processors 801 in the device for video generation, and one processor is used as an example in FIG. 8. In some embodiments of the present disclosure, the processor 801, the memory 802, the input device 803, and the output device 804 may be connected by using a bus or other manners, and an example of a connection through a bus is taken in FIG. 8.

The memory 802 may be configured to store software programs and modules, and the processor 801 executes software programs and modules stored in the memory 802 to perform various functional applications and data processing of the device for video generation. The memory 802 may mainly include a storage program area and a storage data area, where the storage program area may store an operating system, an application program required by at least one function, and the like. In addition, the memory 802 may include a high-speed random-access memory, or may include a non-volatile memory, for example, at least one magnetic disk storage device, a flash memory device, or other volatile solid-state storage device. The input device 803 may be configured to receive inputted numeric or character information, and generate signal input related to user's setting and function control of the device for video generating.

Specifically, in this embodiment, the processor 801 loads the executable file corresponding to the process of one or more application programs into the memory 802 based on the following instruction, and executes the application program stored in the memory 802 by the processor 801, thereby implementing various functions of the foregoing device for video generating.

It should be noted that, in this specification, relational terms such as "first" and "second" are merely used to distinguish one entity or operation from another entity or operation, and do not necessarily require or imply that any such actual relationship or sequence exists between these entities or operations. Moreover, the terms "comprise" "include" or any other variation thereof are intended to cover a non-exclusive inclusion, such that a process, method, item, or device comprise a series of elements including not only those elements, but also other elements not expressly listed, or elements inherent to such a process, method, item, or device. Without further restriction, the elements defined by the statement "include one . . . " do not preclude the presence of additional identical elements in the process, method, item, or device that include the elements.

The above descriptions are only specific embodiments of the present disclosure, so that those skilled in the art can understand or implement the present disclosure. Various modifications to these embodiments will be apparent to those skilled in the art, the general principles defined herein may be implemented in other embodiments without departing from the spirit or scope of the present disclosure. Accordingly, the present disclosure will not be limited to these embodiments described herein, but is to be accorded the widest scope consistent with the principles and novel features disclosed herein.

I claim:

1. A method for video generation, comprising:

obtaining a plurality of media materials with a sequential relationship, wherein the media material is a picture or a video clip, and the plurality of media materials comprise a first media material and a second media material with an adjacent sequential relationship;

generating a first video clip based on the first media material and generating a second video clip based on the second media material;

generating, based on the first and second video clips, a merged video clip, wherein the merged video clip comprises a first video sub-clip from the first video clip and a second video sub-clip from the second video clip, and an image similarity of adjacent image frames between the first and second video sub-clips meets a predetermined similarity condition; and generating a target video based on the merged video clip.

2. The method of claim 1, wherein generating, based on the first and second video clips, the merged video clip comprises:

determining, based on the image similarity, a first image frame and a second image frame from the first and second video clips, respectively, wherein the first image frame is from the first video clip, and the second image frame is from the second video clip;

clipping, based on the first image frame, the first video sub-clip from the first video clip, and clipping, based on the second image frame, the second video sub-clip from the second video clip; and generating, based on the adjacent sequential relationship and the first and second video sub-clips, the merged video clip.

3. The method of claim 2, wherein the first media material among the first and second media materials with the adjacent sequential relationship precedes the second media material, and before generating, based on the adjacent sequential relationship and the first and second video sub-clips, the merged video clip, the method further comprises:

obtaining a second reversed video sub-clip by performing a reverse playback processing on the second video sub-clip, and correspondingly, generating, based on the adjacent sequential relationship and the first and second video sub-clips, the merged video clip comprises:

generating the merged video clip based on the adjacent sequential relationship, the first video sub-clip and the second reversed video sub-clip.

4. The method of claim 2, wherein after generating the merged video clip based on the adjacent sequential relationship and the first and second video sub-clips, the method further comprises:

determining whether a total number of image frames of the merged video clip is less than a predetermined number threshold; and in accordance with a determination that the total number of image frames is less than the predetermined number threshold, triggering to perform the determining, based on the image similarity, the first and second image frames from the first and second video clips, respectively, until a merged video clip whose total number of image frames is no less than the predetermined number threshold is obtained.

5. The method of claim 1, wherein the plurality of media materials further comprises a third media material that is a last media material of the plurality of media materials with the sequential relationship, and before generating the target video based on the merged video clip, the method further comprises:

generating a third video clip based on the third media material, and correspondingly, generating the target video based on the merged video clip comprises:

performing a merging processing based on the sequential relationship, the merged video clip and the third video clip, to obtain the target video.

6. The method of claim 1, wherein the target video comprises image frames respectively corresponding to the plurality of media materials, and the image frames respectively corresponding to the plurality of media materials meet the sequential relationship.

7. The method of claim 1, wherein generating the first video clip based on the first media material and generating the second video clip based on the second media material comprises:

generating, based on predetermined public target content, the first video clip by using the first media material as an initial image frame, and generating the second video clip by using the second media material as an initial image frame.

8. A non-transitory computer readable storage medium, wherein the computer readable storage medium stores instructions, the instructions when performed by a terminal device, causing the terminal device to implement acts comprising:

obtaining a plurality of media materials with a sequential relationship, wherein the media material is a picture or a video clip, and the plurality of media materials comprise a first media material and a second media material with an adjacent sequential relationship;

generating a first video clip based on the first media material and generating a second video clip based on the second media material;

generating, based on the first and second video clips, a merged video clip, wherein the merged video clip comprises a first video sub-clip from the first video clip and a second video sub-clip from the second video clip, and an image similarity of adjacent image frames between the first and second video sub-clips meets a predetermined similarity condition; and generating a target video based on the merged video clip.

9. The non-transitory computer readable storage medium of claim 8, wherein generating, based on the first and second video clips, the merged video clip comprises:

determining, based on the image similarity, a first image frame and a second image frame from the first and second video clips, respectively, wherein the first image frame is from the first video clip, and the second image frame is from the second video clip;

clipping, based on the first image frame, the first video sub-clip from the first video clip, and clipping, based on the second image frame, the second video sub-clip from the second video clip; and generating, based on the adjacent sequential relationship and the first and second video sub-clips, the merged video clip.

10. The non-transitory computer readable storage medium of claim 9, wherein the first media material among the first and second media materials with the adjacent sequential relationship precedes the second media material, and before generating, based on the adjacent sequential relationship and the first and second video sub-clips, the merged video clip, the acts further comprise:

obtaining a second reversed video sub-clip by performing a reverse playback processing on the second video sub-clip, and correspondingly, generating, based on the adjacent sequential relationship and the first and second video sub-clips, the merged video clip comprises:

generating the merged video clip based on the adjacent sequential relationship, the first video sub-clip and the second reversed video sub-clip.

11. The non-transitory computer readable storage medium of claim 9, wherein after generating the merged video clip based on the adjacent sequential relationship and the first and second video sub-clips, the acts further comprise:

determining whether a total number of image frames of the merged video clip is less than a predetermined number threshold; and in accordance with a determination that the total number of image frames is less than the predetermined number threshold, triggering to perform the determining, based on the image similarity, the first and second image frames from the first and second video clips, respectively, until a merged video clip whose total number of image frames is no less than the predetermined number threshold is obtained.

12. The non-transitory computer readable storage medium of claim 8, wherein the plurality of media materials further comprises a third media material that is a last media material of the plurality of media materials with the sequential relationship, and before generating the target video based on the merged video clip, the acts further comprise:

generating a third video clip based on the third media material, and correspondingly, generating the target video based on the merged video clip comprises:

performing a merging processing based on the sequential relationship, the merged video clip and the third video clip, to obtain the target video.

13. The non-transitory computer readable storage medium of claim 8, wherein the target video comprises image frames respectively corresponding to the plurality of media materials, and the image frames respectively corresponding to the plurality of media materials meet the sequential relationship.

14. The non-transitory computer readable storage medium of claim 8, wherein generating the first video clip based on the first media material and generating the second video clip based on the second media material comprises:

generating, based on predetermined public target content, the first video clip by using the first media material as an initial image frame, and generating the second video clip by using the second media material as an initial image frame.

15. A device for video generation, comprising a memory, a processor, and a computer program that is stored in the memory and executable on the processor, wherein the processor, when performing the computer program, implements acts comprising:

obtaining a plurality of media materials with a sequential relationship, wherein the media material is a picture or a video clip, and the plurality of media materials comprise a first media material and a second media material with an adjacent sequential relationship;

generating a first video clip based on the first media material and generating a second video clip based on the second media material;

generating, based on the first and second video clips, a merged video clip, wherein the merged video clip comprises a first video sub-clip from the first video clip and a second video sub-clip from the second video clip, and an image similarity of adjacent image frames between the first and second video sub-clips meets a predetermined similarity condition; and generating a target video based on the merged video clip.

16. The device of claim 15, wherein generating, based on the first and second video clips, the merged video clip comprises:

determining, based on the image similarity, a first image frame and a second image frame from the first and second video clips, respectively, wherein the first image frame is from the first video clip, and the second image frame is from the second video clip;

clipping, based on the first image frame, the first video sub-clip from the first video clip, and clipping, based on the second image frame, the second video sub-clip from the second video clip; and generating, based on the adjacent sequential relationship and the first and second video sub-clips, the merged video clip.

17. The device of claim 16, wherein the first media material among the first and second media materials with the adjacent sequential relationship precedes the second media material, and before generating, based on the adjacent sequential relationship and the first and second video sub-clips, the merged video clip, the acts further comprise:

obtaining a second reversed video sub-clip by performing a reverse playback processing on the second video sub-clip, and correspondingly, generating, based on the adjacent sequential relationship and the first and second video sub-clips, the merged video clip comprises:

generating the merged video clip based on the adjacent sequential relationship, the first video sub-clip and the second reversed video sub-clip.

18. The device of claim 16, wherein after generating the merged video clip based on the adjacent sequential relationship and the first and second video sub-clips, the acts further comprise:

determining whether a total number of image frames of the merged video clip is less than a predetermined number threshold; and in accordance with a determination that the total number of image frames is less than the predetermined number threshold, triggering to perform the determining, based on the image similarity, the first and second image frames from the first and second video clips, respectively, until a merged video clip whose total number of image frames is no less than the predetermined number threshold is obtained.

19. The device of claim 15, wherein the plurality of media materials further comprises a third media material that is a last media material of the plurality of media materials with the sequential relationship, and before generating the target video based on the merged video clip, the acts further comprise:

generating a third video clip based on the third media material, and correspondingly, generating the target video based on the merged video clip comprises:

performing a merging processing based on the sequential relationship, the merged video clip and the third video clip, to obtain the target video.

20. The device of claim 15, wherein the target video comprises image frames respectively corresponding to the plurality of media materials, and the image frames respectively corresponding to the plurality of media materials meet the sequential relationship.

\* \* \* \* \*